(12) United States Patent
Kimura et al.

(10) Patent No.: US 11,079,006 B2
(45) Date of Patent: Aug. 3, 2021

(54) DIFFERENTIAL UNIT AND DIFFERENTIAL UNIT PRODUCT LINE

(71) Applicant: JTEKT CORPORATION, Osaka (JP)

(72) Inventors: Takao Kimura, Miyoshi (JP); Yutaka Sato, Seto (JP)

(73) Assignee: JTEKT CORPORATION, Osaka (JP)

( * ) Notice: Subject to any disclaimer, the term of this patent is extended or adjusted under 35 U.S.C. 154(b) by 0 days.

(21) Appl. No.: 16/826,348

(22) Filed: Mar. 23, 2020

(65) Prior Publication Data

US 2020/0309244 A1    Oct. 1, 2020

(30) Foreign Application Priority Data

Mar. 28, 2019    (JP) .............................. JP2019-063438

(51) Int. Cl.
| | |
|---|---|
| *F16H 57/037* | (2012.01) |
| *F16H 57/021* | (2012.01) |
| *F16H 57/04* | (2010.01) |
| *F16H 48/08* | (2006.01) |

(52) U.S. Cl.
CPC ........... *F16H 57/037* (2013.01); *F16H 48/08* (2013.01); *F16H 57/021* (2013.01); *F16H 57/0483* (2013.01)

(58) Field of Classification Search
None
See application file for complete search history.

(56) References Cited

U.S. PATENT DOCUMENTS

| | | | | |
|---|---|---|---|---|
| 3,444,960 A | * | 5/1969 | Killius | .................... F16H 48/22 |
| | | | | 184/6.12 |
| 4,018,097 A | * | 4/1977 | Ross | ..................... F16H 57/037 |
| | | | | 74/467 |
| 2016/0377168 A1 | * | 12/2016 | Nahrwold | ............. F16H 57/037 |
| | | | | 475/160 |

FOREIGN PATENT DOCUMENTS

JP          2010-216566 A        9/2010

* cited by examiner

*Primary Examiner* — Colby M Hansen
(74) *Attorney, Agent, or Firm* — Oblon, McClelland, Maier & Neustadt, L.L.P.

(57) ABSTRACT

A differential unit includes: a pinion gear shaft including a shaft portion and a gear portion; a ring gear meshing with the gear portion; a differential case that rotates with the ring gear; a differential gear mechanism accommodated in the differential case; a differential carrier having an accommodating space accommodating the differential case and the ring gear; and a pair of bearings supporting the pinion gear shaft such that the pinion gear shaft is rotatable with respect to the differential carrier. The differential carrier has an inner cylindrical portion, an outer cylindrical portion, and a connecting portion that are provided as a single member. The inner cylindrical portion has the pair of bearings fitted in the inner cylindrical portion. The outer cylindrical portion is provided radially outward of the inner cylindrical portion. The connecting portion connects the inner cylindrical portion and the outer cylindrical portion.

6 Claims, 5 Drawing Sheets

DIFFERENTIAL UNIT AND DIFFERENTIAL UNIT PRODUCT LINE

CROSS-REFERENCE TO RELATED APPLICATION

This application claims priority to Japanese Patent Application No. 2019-063438 filed on Mar. 28, 2019, incorporated herein by reference in its entirety.

BACKGROUND

1. Technical Field

The invention relates to differential units for vehicles and differential unit product lines comprised of a plurality of differential units.

2. Description of Related Art

For example, a differential unit mounted on a four-wheel drive vehicle or a rear-wheel drive vehicle includes: a pinion gear shaft having a shaft portion and a gear portion that are provided as a single member; a ring gear meshing with the gear portion of the pinion gear shaft; a differential case that rotates with the ring gear; a differential gear mechanism accommodated in the differential case; a differential carrier accommodating the differential case and the ring gear together with a part of the shaft portion of the pinion gear shaft; and a pair of bearings supporting the pinion gear shaft such that the pinion gear shaft is rotatable with respect to the differential carrier. The meshing portion between the pinion gear shaft and the ring gear and the differential gear mechanism are lubricated by lubricating oil (differential oil) enclosed in the differential carrier (see, e.g., Japanese Unexamined Patent Application Publication No. 2010-216566 (JP 2010-216566 A)).

SUMMARY

When support rigidity of the pair of bearings in the differential carrier is low in the differential unit configured as described above, the pinion gear shaft is tilted by torque transmitted between the pinion gear shaft and the ring gear, which may facilitate wear and heat generation due to improper teeth contact. In order to increase the support rigidity of the pair of bearings, the thickness of a part of the differential carrier that support the pair of bearings can be increased. However, merely increasing the thickness of such a part of the differential carrier will cause an increase in weight of the differential unit.

The invention provides a differential unit capable of increasing support rigidity for a pinion gear shaft while restraining an increase in weight of the differential unit, and a differential gear product line.

A differential unit according to a first aspect of the invention includes: a pinion gear shaft including a shaft portion and a gear portion; a ring gear meshing with the gear portion; a differential case that rotates with the ring gear; a differential gear mechanism accommodated in the differential case; a differential carrier having an accommodating space accommodating the differential case and the ring gear; and a pair of bearings supporting the pinion gear shaft such that the pinion gear shaft is rotatable with respect to the differential carrier. The differential carrier has an inner cylindrical portion, an outer cylindrical portion, and a connecting portion that are provided as a single member, the inner cylindrical portion having a bearing fitting surface in an inner peripheral surface, the pair of bearings being fitted on the bearing fitting surface, the outer cylindrical portion being provided radially outward of the inner cylindrical portion, and the connecting portion connecting the inner cylindrical portion and the outer cylindrical portion. A differential unit product line according to a second aspect of the invention includes a plurality of differential units. The plurality of differential units have the configuration according to the first aspect, and an axial position of a second partition wall with respect to the inner cylindrical portion and the outer cylindrical portion is different between or among the plurality of differential units.

According to the aspects of the invention, support rigidity for the pinion gear shaft can be increased while restraining an increase in weight of the differential unit.

BRIEF DESCRIPTION OF THE DRAWINGS

Features, advantages, and technical and industrial significance of exemplary embodiments of the invention will be described below with reference to the accompanying drawings, in which like signs denote like elements, and wherein.

DETAILED DESCRIPTION OF EMBODIMENTS

Embodiment

An embodiment of the invention will be described with reference to FIGS. 1 to 6. The following embodiment is shown as a suitable example for carrying out the invention and, in some parts, specifically illustrates various technical matters that are technically preferable. However, the technical scope of the invention is not limited to this specific form.

Overall Configuration of Four-Wheel Drive Vehicle

Figure 1:
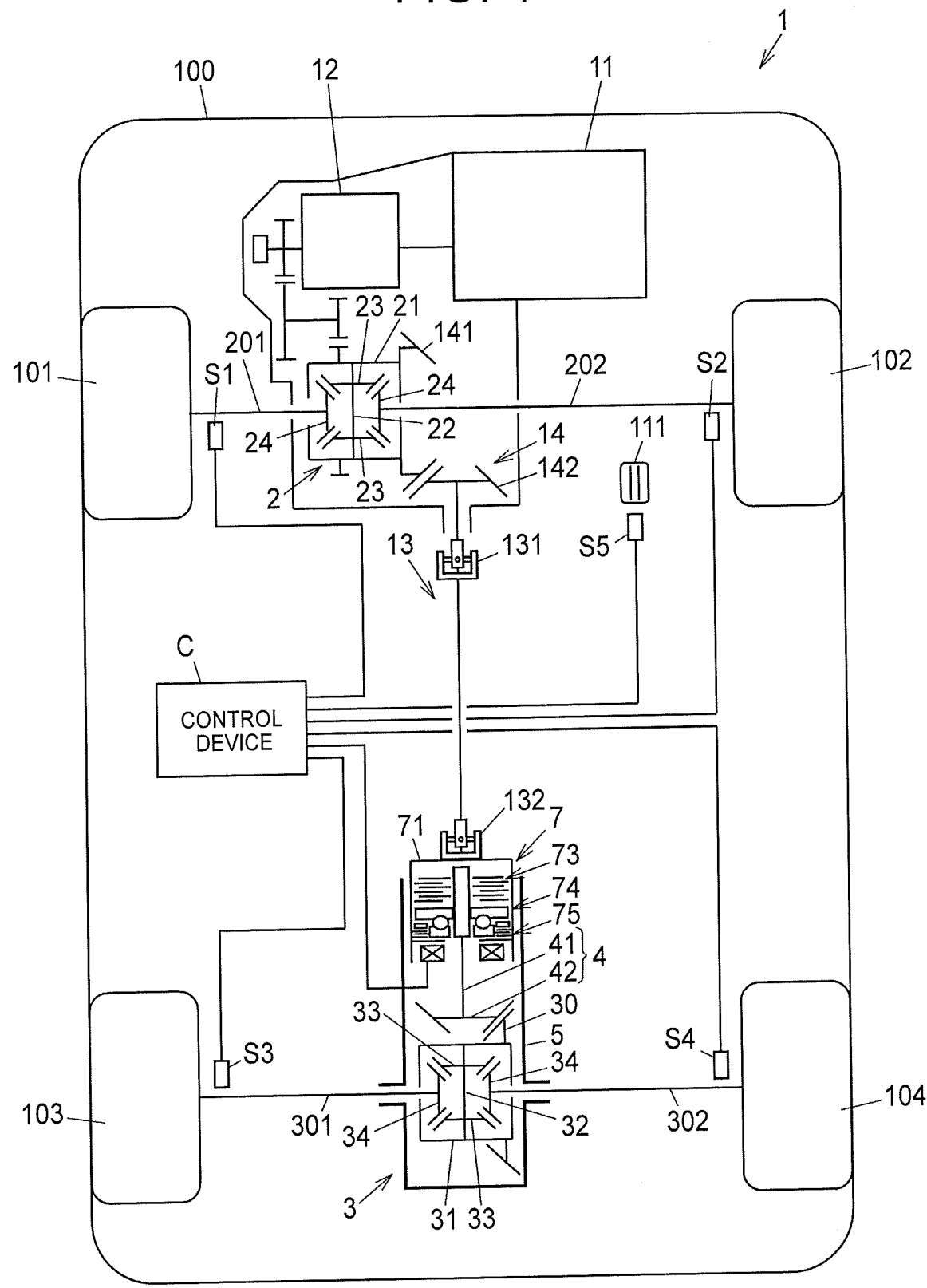
FIG. 1 is a schematic configuration diagram illustrating a schematic configuration example of a four-wheel drive vehicle equipped with a driving force transmission device according to an embodiment of the invention.

FIG. 1 is a schematic configuration diagram illustrating a schematic configuration example of a four-wheel drive vehicle equipped with a driving force transmission device according to an embodiment of the invention. A four-wheel drive vehicle 1 includes right and left front wheels 102, 101 as main drive wheels and right and left rear wheels 104, 103 as auxiliary drive wheels. A speed of the driving force of a driving source 11 is changed by a transmission 12 and the shifted driving force is constantly transmitted to the front wheels 102, 101 and is also transmitted to the rear wheels 104, 103 depending on the vehicle state. The driving source 11 is, for example, an engine, and may be an electric motor or may be a combination of an engine and an electric motor.

The four-wheel drive vehicle 1 includes, as a driving force transmission system for transmitting the driving force of the driving source 11 of which speed is changed by the transmission 12 to the right and left front wheels 102, 101 and the right and left rear wheels 104, 103, front differential unit 2 and rear differential unit 3, right and left drive shafts 202, 201, right and left drive shafts 302, 301, a propeller shaft 13, a gear mechanism 14, and a driving force transmission device 7. The right and left drive shafts 202, 201 are disposed between the front differential unit 2 and the right and left front wheels 102, 101. The right and left drive shafts 302, 301 are disposed between the rear differential unit 3 and the right and left rear wheels 104, 103. The propeller shaft 13 transmits the driving force in the longitudinal direction of the vehicle. The gear mechanism 14 is disposed between the front differential unit 2 and the propeller shaft 13. The driving force transmission device 7 is coupled to the rear end of the propeller shaft 13.

The front differential unit 2 includes a front differential case 21, a pinion pin 22, a pair of pinion gears 23, and a pair of side gears 24. The pinion pin 22 is fixed to the front differential case 21. The pair of pinion gears 23 are supported by the pinion pin 22. The pair of side gears 24 mesh with the pair of pinion gears 23. The right and left drive shafts 202, 201 are fixed to the pair of side gears 24. The driving force of the driving source 11 is transmitted from the transmission 12 to the front differential case 21. The gear mechanism 14 is comprised of a ring gear 141 fixed to the front differential case 21 and a pinion gear 142 meshing with the ring gear 141.

The propeller shaft 13 has universal joints 131, 132 at its front and rear ends. The front universal joint 131 is attached to the pinion gear 142. The rear universal joint 132 is attached to a front housing 71 of the driving force transmission device 7 described later.

Figure 2:
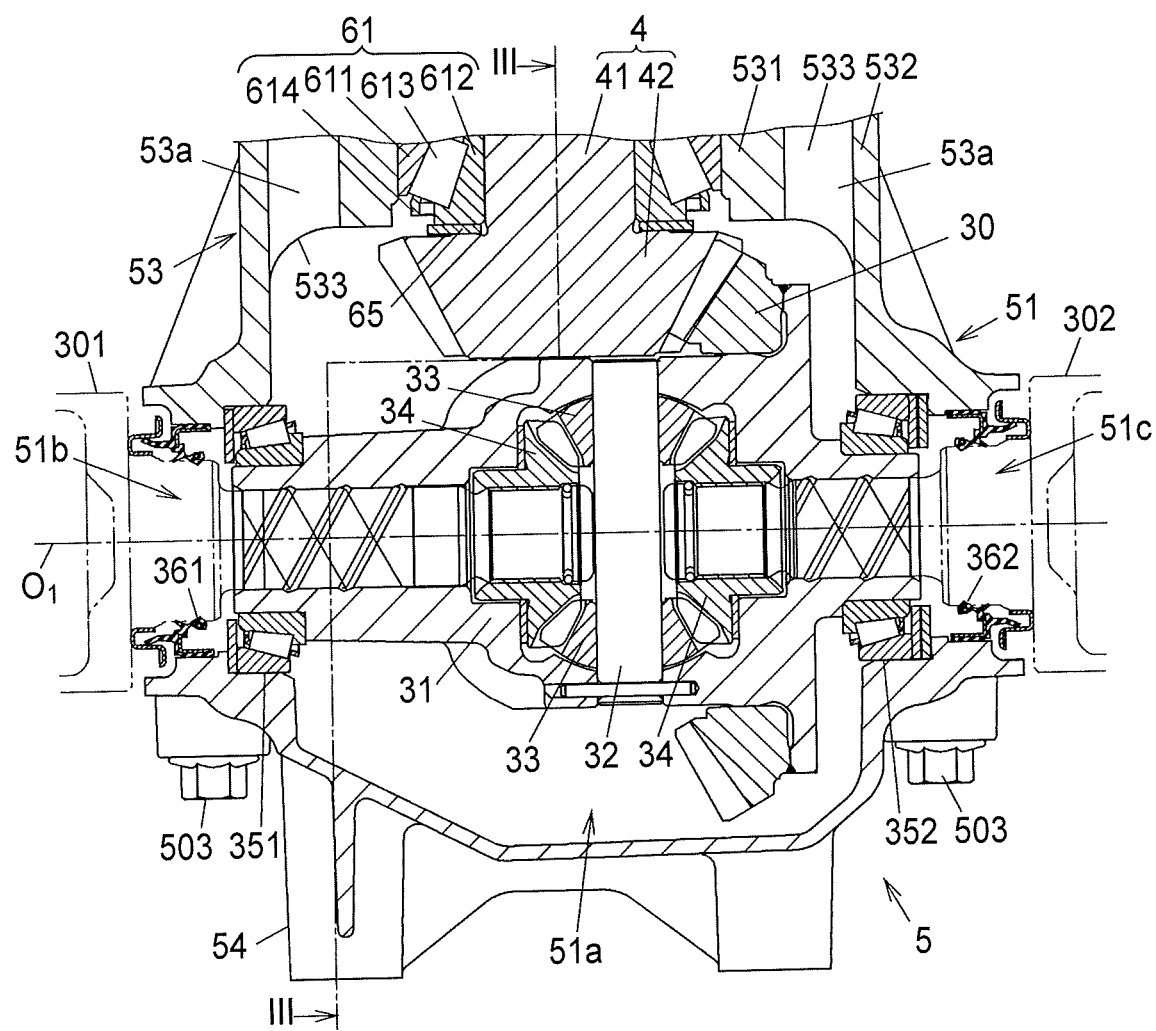
FIG. 2 shows a horizontal section of a part of a rear differential unit.
Figure 3:
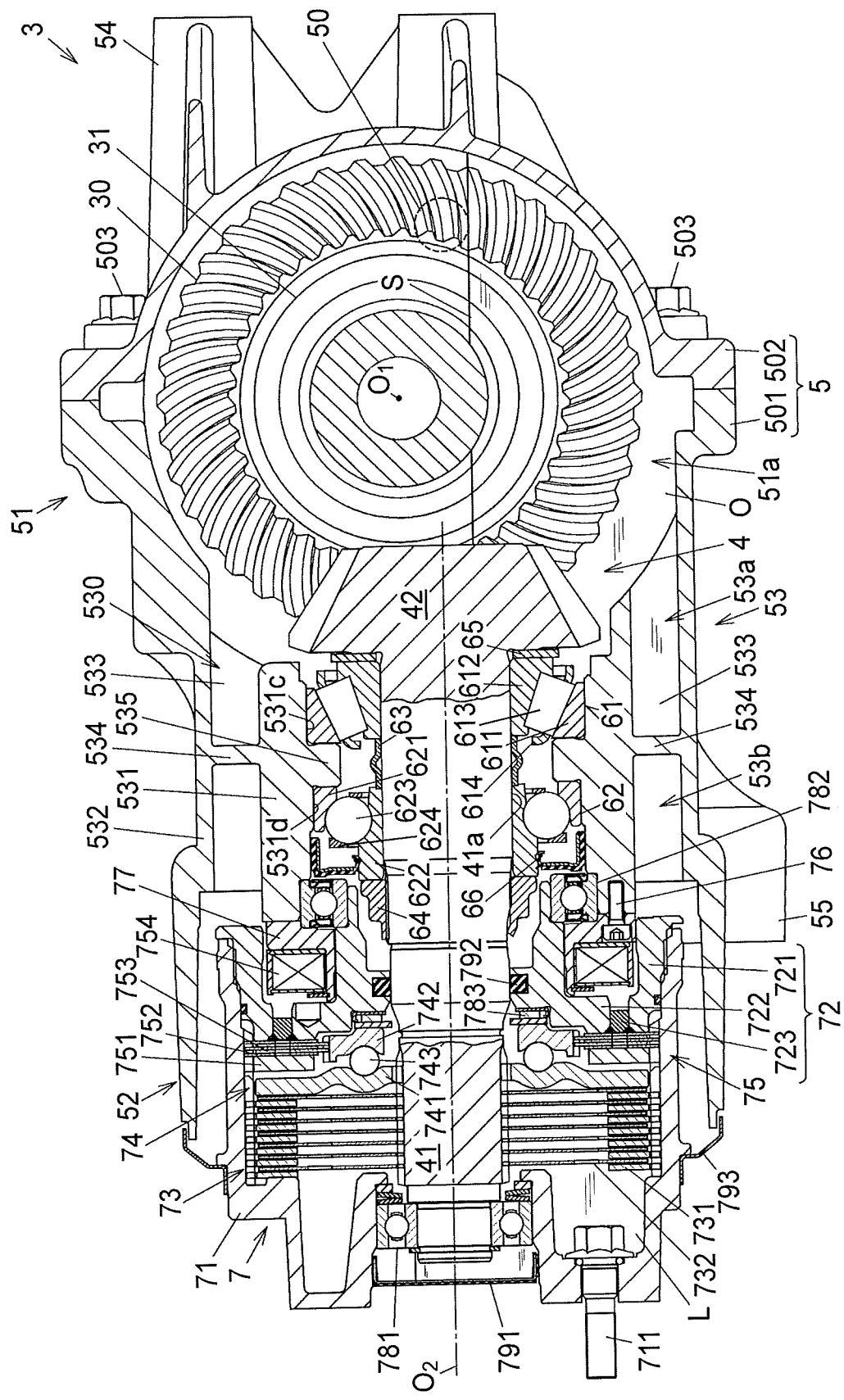
FIG. 3 shows a vertical section of the rear differential unit and the driving force transmission device taken along line in FIG. 2.

FIG. 2 shows a horizontal section of a part of the rear differential unit 3. FIG. 3 is a sectional view of the rear differential unit 3 and the driving force transmission device 7 taken along line in FIG. 2. Hereinafter, the rear differential unit 3 is simply referred to as the differential unit 3.

The differential unit 3 includes a ring gear 30, a rear differential case 31, a pinion pin 32, a pair of pinion gears 33, and a pair of side gears 34. The rear differential case 31 rotates with the ring gear 30. The pinion pin 32 is fixed to the rear differential case 31. The pair of pinion gears 33 are supported by the pinion pin 32. The pair of side gears 34 mesh with the pair of pinion gears 33. The ring gear 30 and the rear differential case 31 rotate about a rotation axis $O_1$ extending in the lateral direction of the vehicle. The right and left drive shafts 302, 301 are fixed to the pair of side gears 34. The pair of pinion gears 33 and the pair of side gears 34 are a form of a differential gear mechanism accommodated in the rear differential case 31.

The differential unit 3 includes a pinion gear shaft 4, a differential carrier 5, and a pair of bearings 61, 62. The pinion gear shaft 4 has a shaft portion 41 and a gear portion 42. The differential carrier 5 has an accommodating space 51a accommodating the ring gear 30 and the differential case 31. The pair of bearings 61, 62 support the pinion gear shaft 4 such that the pinion gear shaft 4 is rotatable with respect to the differential carrier 5. The rear differential case 31 has its both ends in the lateral direction of the vehicle supported by bearings 351, 352 such that the rear differential case 31 is rotatable with respect to the differential carrier 5. In the present embodiment, the bearings 351, 352 are tapered roller bearings.

The pinion gear shaft 4 is supported by the pair of bearings 61, 62 and rotates about a rotation axis $O_2$ extending in the longitudinal direction of the vehicle. The gear portion 42 of the pinion gear shaft 4 meshes with the ring gear 30. The gear portion 42 of the pinion gear shaft 4 and the ring gear 30 form a hypoid gear pair. The shaft portion 41 of the pinion gear shaft 4 has a columnar shape with a smaller diameter than the gear portion 42. The gear portion 42 is continuous with the rear end of the shaft portion 41 in the longitudinal direction of the vehicle. The pinion gear shaft 4 is coupled to the propeller shaft 13 via the driving force transmission device 7. Hereinafter, a direction parallel to the rotation axis $O_2$ is sometimes referred to as the axial direction.

The driving force transmission device 7 is controlled by a control device C and can adjust the driving force that is transmitted from the propeller shaft 13 to the pinion gear shaft 4 according to the vehicle state. The control device C can obtain detection values of rotational speed sensors S1 to S4 and a detection value of an accelerator pedal sensor S5. The rotational speed sensors S2, S1, S4, S3 detect the rotational speeds of the right and left front wheels 102, 101 and the right and left rear wheels 104, 103. The accelerator pedal sensor S5 detects the amount by which an accelerator pedal 111 is depressed. The control device C controls the driving force transmission device 7 based on the detection values of these sensors S1 to S5, etc.

The driving force transmission device 7 includes the front housing 71, a rear housing 72, a main clutch 73, a cam mechanism 74, and an electromagnetic clutch mechanism 75. The universal joint 132 of the propeller shaft 13 is attached to the front housing 71. The rear housing 72 rotates with the front housing 71. The main clutch 73 is disposed between the front housing 71 and the pinion gear shaft 4. The cam mechanism 74 generates a thrust that presses the main clutch 73. The electromagnetic clutch mechanism 75 operates the cam mechanism 74.

The front housing 71 has a bottomed cylindrical shape, and the universal joint 132 is attached to the front end of the front housing 71 in the longitudinal direction of the vehicle by a bolt 711. The rear housing 72 includes an outer magnetic member 721, an inner magnetic member 722, and an annular non-magnetic ring 723. The outer magnetic member 721 and the inner magnetic member 722 are made of a soft magnetic metal such as iron. The non-magnetic ring 723 is disposed between the outer magnetic member 721 and the inner magnetic member 722. The front housing 71 is supported on the shaft portion 41 of the pinion gear shaft 4 by a bearing 781 such that the front housing 71 is rotatable relative to the shaft portion 41. The rear housing 72 is supported by a bearing 782 such that the rear housing 72 is rotatable with respect to the differential carrier 5.

The main clutch 73 is comprised of a plurality of main outer clutch plates 731 and a plurality of main inner clutch plates 732. The plurality of main outer clutch plates 731 are engaged with the front housing 71 such that the plurality of main outer clutch plates 731 are movable in the axial direction and not rotatable relative to the front housing 71. The plurality of main inner clutch plates 732 are engaged with the shaft portion 41 of the pinion gear shaft 4 such that the plurality of main inner clutch plates 732 are movable in the axial direction and not rotatable relative to the shaft portion 41 of the pinion gear shaft 4. The main clutch 73 is pressed by the thrust generated by the cam mechanism 74, and the main outer clutch plates 731 and the main inner clutch plates 732 come into frictional contact with each other. The main clutch 73 thus transmits the driving force from the front housing 71 to the pinion gear shaft 4.

The cam mechanism 74 includes a main cam 741, a pilot cam 742, and a plurality of cam balls 743. The main cam 741 and the pilot cam 742 are disposed next to each other in the axial direction. The plurality of cam balls 743 are arranged between the main cam 741 and the pilot cam 742. The main cam 741 is engaged with the shaft portion 41 of the pinion gear shaft 4 such that the main cam 741 is movable in the axial direction and not rotatable relative to the shaft portion 41. Each of the main cam 741 and the pilot cam 742 has a cam groove extending in an arc shape in the circumferential direction. The axial depth of each cam groove gradually decreases from its middle portion toward its ends in the circumferential direction. The cam balls 743 are arranged in the cam grooves of the main cam 741 and the pilot cam 742. When the pilot cam 742 rotates relative to the main cam 741, the cam balls 743 roll along the cam grooves and generate a thrust that presses the main clutch 73. A bearing 783 is disposed between the pilot cam 742 and the inner magnetic member 722.

The electromagnetic clutch mechanism 75 includes an armature 751, a plurality of pilot outer clutch plates 752, a plurality of pilot inner clutch plates 753, and an electromagnetic coil 754. The armature 751 and the plurality of pilot outer clutch plates 752 are engaged with the front housing 71 such that the armature 751 and the plurality of pilot outer clutch plates 752 are movable in the axial direction and not rotatable relative to the front housing 71. The plurality of pilot inner clutch plates 753 are engaged with the pilot cam 742 such that the plurality of pilot inner clutch plates 753 are movable in the axial direction and not rotatable relative to the pilot cam 742. The plurality of pilot outer clutch plates 752 and the plurality of pilot inner clutch plates 753 are disposed on the front side of the rear housing 72 in the longitudinal direction of the vehicle. The electromagnetic coil 754 is supported by a yoke 77 fixed to the differential carrier 5 by a bolt 76. The electromagnetic coil 754 is disposed on the rear side of the rear housing 72 in the longitudinal direction of the vehicle.

An excitation current is supplied from the control device C to the electromagnetic coil 754 via wiring, not shown. The armature 751 is attracted by the magnetic force of the electromagnetic coil 754 and presses the plurality of pilot outer clutch plates 752 and the plurality of pilot inner clutch plates 753. The rotational force of the front housing 71 is thus transmitted to the pilot cam 742, and the pilot cam 742 rotates relative to the main cam 741.

Lubricating oil L is enclosed in the front housing 71. The lubricating oil L has viscosity suitable for causing the main outer clutch plates 731 and the main inner clutch plates 732 of the main clutch 73 to smoothly frictionally slide with respect to each other. Leakage of the lubricating oil L to the outside is suppressed by a cap 791 and an X-ring 792. The cap 791 is fitted in the front housing 71, and the X-ring 792 is disposed between the inner magnetic member 722 and the shaft portion 41 of the pinion gear shaft 4. An annular dust cover 793 is fitted on the outer peripheral surface of the front housing 71.

The differential carrier 5 is comprised of a body 501 and a lid 502 that are fastened together by a plurality of bolts 503. The body 501 is located on the front side in the longitudinal direction of the vehicle, and the lid 502 is located on the rear side in the longitudinal direction of the vehicle. The differential carrier 5 is supported by a support member, not shown, so as not to rotate with respect to a vehicle body 100 (see FIG. 1). The differential carrier 5 includes a first accommodating portion 51, a second accommodating portion 52, a bearing support portion 53, and flange portions 54, 55. The first accommodating portion 51 accommodates the differential case 31 and the ring gear 30. The second accommodating portion 52 accommodates the driving force transmission device 7. The bearing support portion 53 is provided between the first accommodating portion 51 and the second accommodating portion 52 and supports the pair of bearings 61, 62. The support member for attachment of differential carrier 5 to the vehicle body 100 is fastened to the flange portions 54, 55.

Each of the body 501 and the lid 502 is cast using a pair of molds. In the present embodiment, the body 501 and the lid 502 are made of an aluminum alloy and are formed by aluminum die casting. The first accommodating portion 51 is formed by joining the body 501 and the lid 502. The second accommodating portion 52 and the bearing support portion 53 are formed integrally with the body 501.

The differential case 31 and the ring gear 30, together with the gear portion 42 of the pinion gear shaft 4, are accommodated in the accommodating space 51a of the first accommodating portion 51. The first accommodating portion 51 has insertion holes 51b, 51c. The drive shaft 301 is inserted through the insertion hole 51b, and the drive shaft 302 is inserted through the insertion hole 51c. Seal members 361, 362 are mounted in the insertion holes 51b, 51c. In FIG. 2, the drive shafts 301, 302 are shown by hidden outlines (long dashed double-short dashed lines). The second accommodating portion 52 accommodates a part of the front housing 71 in the axial direction, and a part of the front housing 71 protrudes from a front opening of the second accommodating portion 52 in the longitudinal direction of the vehicle.

The pair of bearings 61, 62 are disposed side by side in the axial direction. Hereinafter, the pair of bearings 61, 62 will be described as the first bearing 61 and the second bearing 62. The first bearing 61 is disposed at a position closer to the rear of the vehicle (closer to the gear position 42) than the second bearing 62. In the present embodiment, the first bearing 61 is a tapered roller bearing, and the second bearing 62 is an angular contact ball bearing. However, both the first bearing 61 and the second bearing 62 may be tapered roller bearings, or both the first bearing 61 and the second bearing 62 may be angular contact ball bearings. The first bearing 61 and the second bearing 62 are preloaded by a nut 64 and support the pinion gear shaft 4 such that the pinion gear shaft 4 is rotatable with respect to the differential carrier 5.

The first bearing 61 includes an outer ring 611, an inner ring 612, a plurality of tapered rollers 613, and a cage 614. The plurality of tapered rollers 613 are arranged between the outer ring 611 and the inner ring 612. The cage 614 holds the plurality of tapered rollers 613. The inner ring 612 is fitted on the end of an outer peripheral surface 41a of the shaft portion 41 of the pinion gear shaft 4 on the gear portion 42 side. A shim 65 is disposed between the side surface of the inner ring 612 and the back surface of the gear portion 42.

The second bearing 62 includes an outer ring 621, an inner ring 622, a plurality of spherical balls 623, and a cage 624. The plurality of balls 623 are arranged between the outer ring 621 and the inner ring 622. The cage 624 holds the plurality of balls 623. The inner ring 622 is disposed next to the inner ring 612 of the first bearing 61 and is fitted on the outer peripheral surface 41a of the shaft portion 41 of the pinion gear shaft 4. A spacer 63 is disposed between the inner ring 612 of the first bearing 61 and the inner ring 622 of the second bearing 62. The nut 64 is in contact with the opposite side surface of the inner ring 622 of the second bearing 62 from the spacer 63.

The bearing support portion 53 has a double cylindrical structure. Namely, the bearing support portion 53 has an inner cylindrical portion 531 and an outer cylindrical portion 532. The inner cylindrical portion 531 accommodates the first bearing 61 and the second bearing 62, and the outer cylindrical portion 532 is provided radially outward of the inner cylindrical portion 531. The inner cylindrical portion 531 and the outer cylindrical portion 532 are connected by a connecting portion 530. In the present embodiment, the inner cylindrical portion 531 and the outer cylindrical portion 532 are concentric about the rotation axis $O_2$. However, the outer cylindrical portion 532 may be eccentric with respect to the inner cylindrical portion 531.

The connecting portion 530 includes a plurality of first partition walls 533 and at least one second partition wall 534. The plurality of first partition walls 533 extend in the axial direction and partition the space between the inner cylindrical portion 531 and the outer cylindrical portion 532 into a plurality of sections located next to each other in the circumferential direction. The at least one second partition wall 534 further partitions at least a part of the plurality of sections, which are partitioned by the plurality of first partition walls 533, into two sections located next to each other in the axial direction.

Figure 4A:
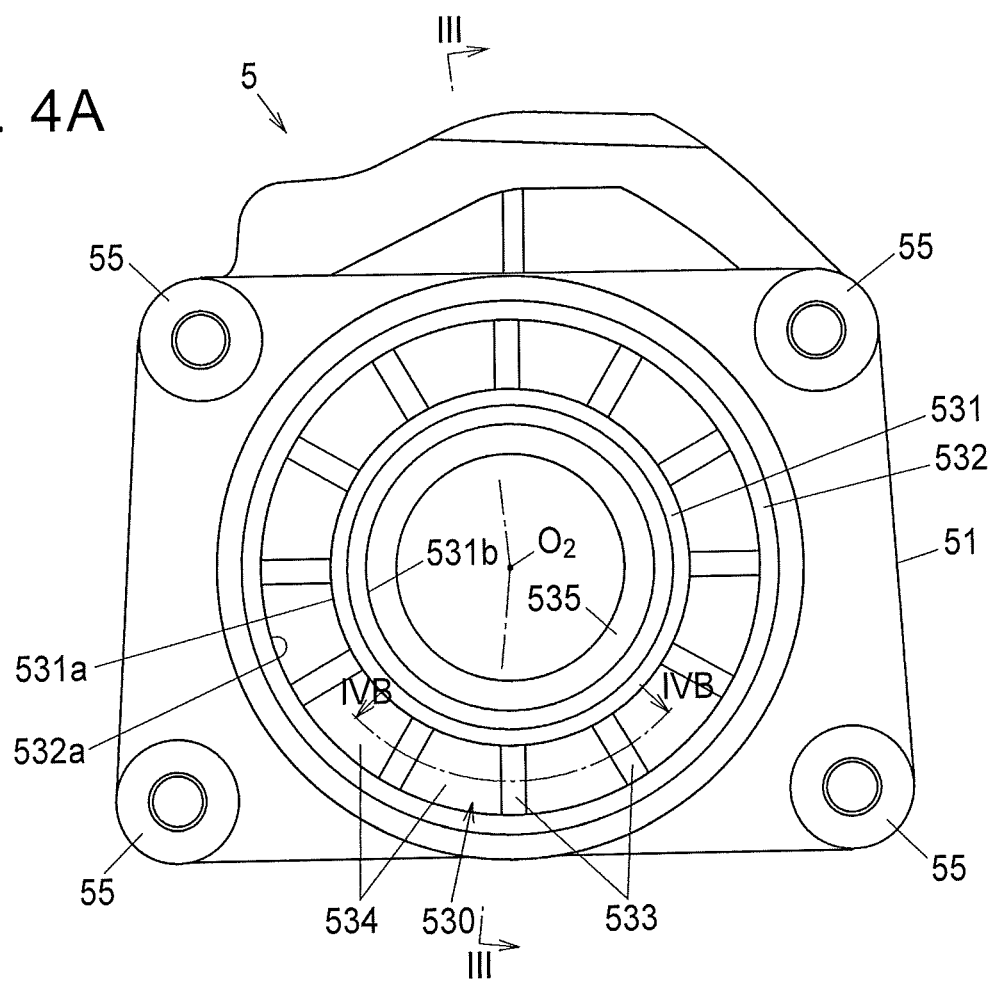
FIG. 4A is a configuration diagram of the differential carrier as viewed from the front side toward the rear side of the vehicle.
Figure 4B:
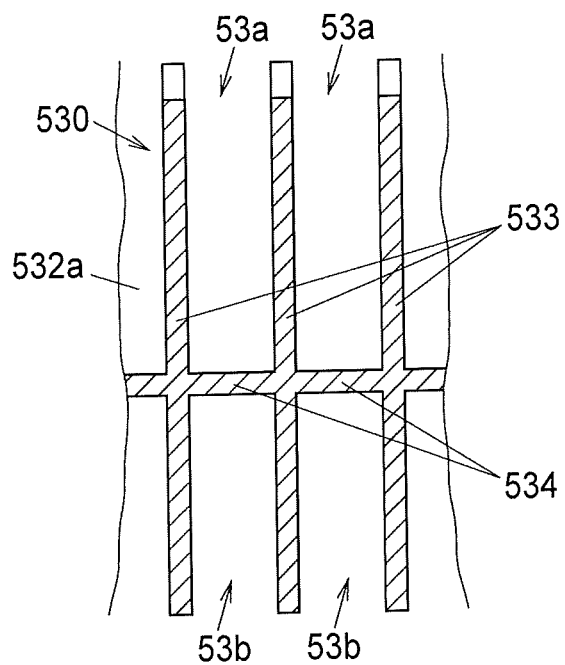
FIG. 4B is a sectional view taken along line IVB-IVB in FIG. 4A.

FIG. 4A is a configuration diagram of the differential carrier 5 as viewed from the front side toward the rear side of the vehicle. FIG. 4B is a sectional view taken along line IVB-IVB in FIG. 4A. In FIG. 3, the differential carrier 5 is shown in a section taken along line in FIG. 4A.

As shown in FIG. 4A, the plurality of first partition walls 533 are disposed in a radial pattern about the rotation axis $O_2$ between an outer peripheral surface 531a of the inner cylindrical portion 531 and an inner peripheral surface 532a of the outer cylindrical portion 532. In the present embodiment, twelve first partition walls 533 are disposed at regular intervals in the circumferential direction of the inner cylindrical portion 531 and the outer cylindrical portion 532.

In the present embodiment, all of the plurality of sections partitioned by the plurality of first partition walls 533 are partitioned into two sections by the same number of second partition walls 534 as the first partition walls 533. However, the invention is not limited to this. The second partition wall 534 need only be provided at least in two or more sections located below the pinion gear shaft 4 among the plurality of sections partitioned by the plurality of first partition walls 533.

The bearing support portion 53 has an annular protruding wall 535 protruding radially inward from an inner peripheral surface 531b (see FIG. 4A) of the inner cylindrical portion 531. The inner cylindrical portion 531 has a bearing fitting surface 531c and a bearing fitting surface 531d in the inner peripheral surface 531b. The outer ring 611 of the first bearing 61 is fitted on the bearing fitting surface 531c and the outer ring 621 of the second bearing 62 is fitted on the bearing fitting surface 531d. The protruding wall 535 protrudes radially inward from between the bearing fitting surfaces 531c, 531d.

The inner cylindrical portion 531, the outer cylindrical portion 532, the plurality of first partition walls 533, the second partition wall 534, and the protruding wall 535 are provided as a single member by casting of the body 501. The bearing support portion 53 has a double cylindrical structure in which the inner cylindrical portion 531 and the outer cylindrical portion 532 are integrally connected by the plurality of first partition walls 533 and the second partition wall 534. This increases support rigidity for supporting the pinion gear shaft 4 via the first bearing 61 and the second bearing 62. The pinion gear shaft 4 is thus restrained from being tilted by the torque transmitted from the gear portion 42 to the ring gear 30.

As shown in FIG. 3, the second partition wall 534 partitions each of the sections partitioned by the first partition walls 533 into a first section 53a located on the rear side of the vehicle (on the first accommodating portion 51 side) and a second section 53b located on the front side of the vehicle (on the second accommodating portion 52 side). The first sections 53a communicate with the accommodating space 51a of the first accommodating portion 51. Lubricating oil O that causes the gear portion 42 of the pinion gear shaft 4 and the ring gear 30 to smoothly mesh with each other is stored in the first sections 53a and the accommodating space 51a.

The lubricating oil O is gear oil (differential oil) having viscosity suitable for lubricating the tooth flanks of the gear portion 42 of the pinion gear shaft 4 and the tooth flanks of the ring gear 30. The lubricating oil O has higher viscosity than the lubricating oil L enclosed in the front housing 71. Leakage of the lubricating oil O from the inside of the inner cylindrical portion 531 is suppressed by a seal member 66 fitted in the inner cylindrical portion 531. The lubricating oil O is injected from an injection hole 50 provided in the differential carrier 5. After the lubricating oil O is injected from the injection hole 50, the injection hole 50 is closed by an injection plug, not shown. In FIG. 2, the injection hole 50 is shown by a dashed line.

The lubricating oil O is injected with the four-wheel drive vehicle 1 stopped on a horizontal place until the lubricating oil O overflows from the injection hole 50. In other words, the injection hole 50 is provided at such a position in the height direction that the lubricating oil O will not be injected into the differential carrier 5 in an amount larger than an appropriate value. The injection hole 50 is provided in the lid 502 at a position closer to the rear of the vehicle than the rotation axis $O_1$.

The lubricating oil O tends to become hot regardless of whether the amount of lubricating oil O is larger or smaller than the appropriate value. When the amount of lubricating oil O is larger than the appropriate value, the oil level S becomes high. In this case, as a large amount of lubricating oil O is scooped up and stirred by the ring gear 30, the oil temperature increases. When the amount of lubricating oil O is smaller than the appropriate value, the oil temperature increases due to the frictional heat between the tooth flanks of the gear portion 42 of the pinion gear shaft 4 and the tooth flanks of the ring gear 30. In view of durability of the differential unit 3, it is desirable that a large amount of lubricating oil O be present in the differential carrier 5. The larger the amount of lubricating oil O is, the more degradation of the lubricating oil O is reduced.

In the present embodiment, the lubricating oil O is stored in the first sections 53a of the bearing support portion 53. A larger amount of lubricating oil O can thus be stored without making the oil level S of the lubricating oil O higher. The durability can thus be improved without restraining an increase in oil temperature.

Figure 5:
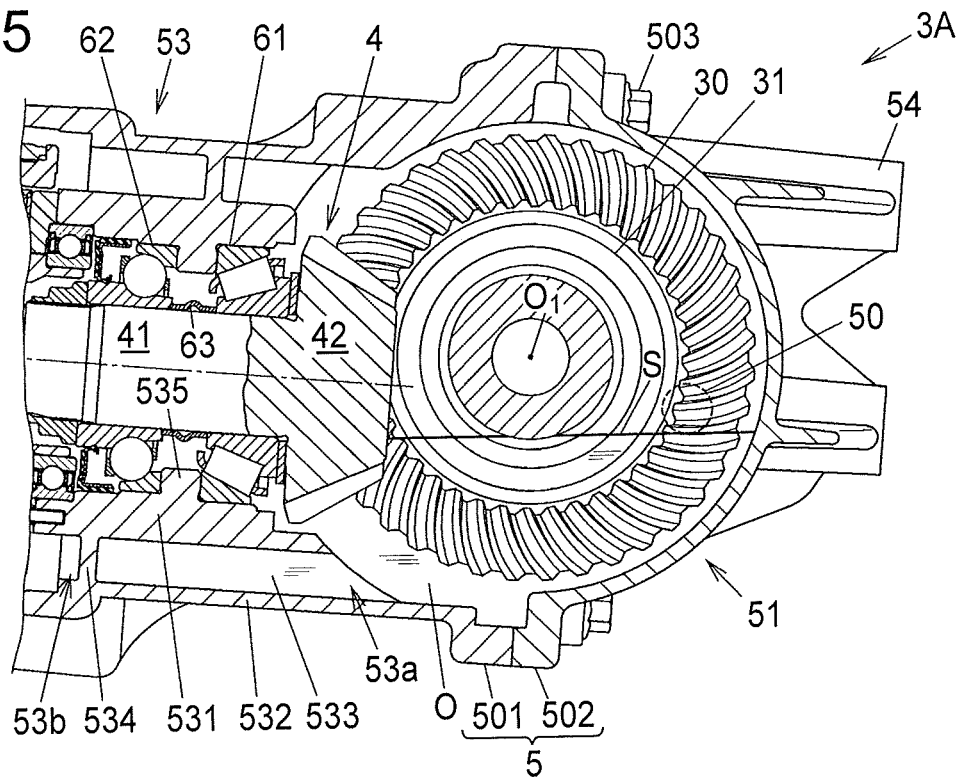
FIG. 5 is a sectional view of a first modification example of the differential unit.
Figure 6:
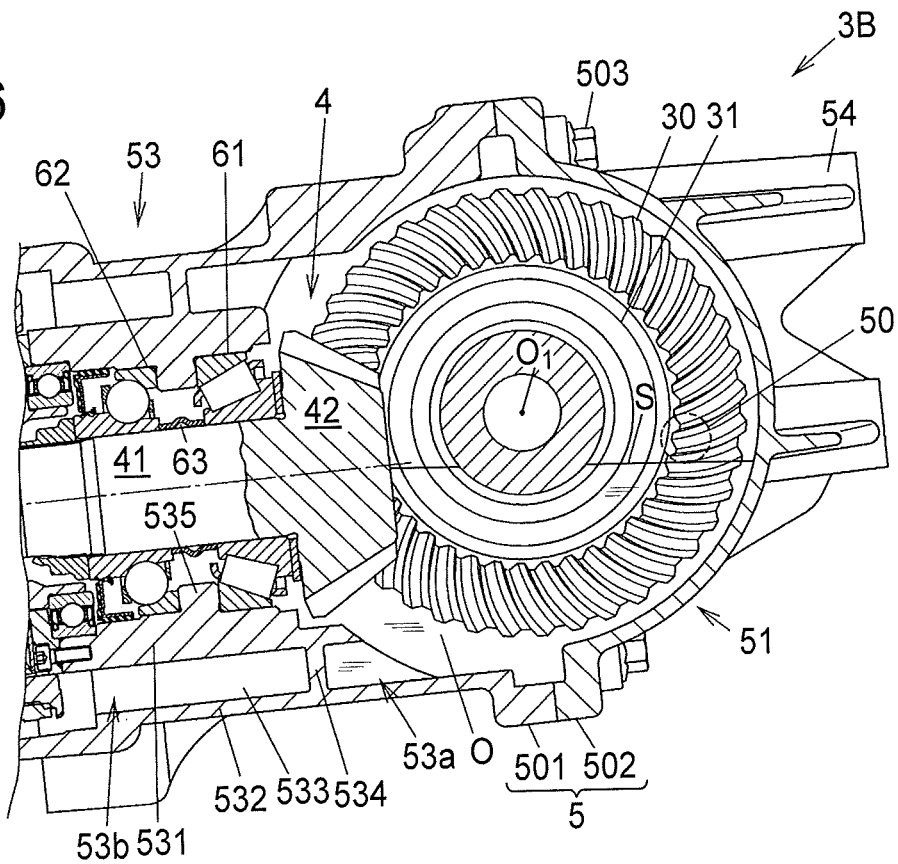
FIG. 6 is a sectional view of a second modification example of the differential unit.

FIGS. 5 and 6 are sectional views of modification examples of the differential unit 3. FIG. 5 illustrates a differential unit 3A according to a first modification example, and FIG. 6 illustrates a differential unit 3B according to a second modification example.

As shown in FIGS. 5 and 6, depending on the configuration of the four-wheel drive vehicle 1, the differential units 3A, 3B may be attached to the vehicle body 100 such that the differential units 3A, 3B are tilted with respect to the horizontal direction. In the example shown in FIG. 5, the differential unit 3A is tilted such that its front side in the longitudinal direction of the vehicle is located higher in the vertical direction than its rear side in the longitudinal direction of the vehicle. In the example shown in FIG. 6, the differential unit 3B is tilted such that its rear side in the longitudinal direction of the vehicle is located higher in the vertical direction than its front side in the longitudinal direction of the vehicle. The differential unit 3 according to the above embodiment and the differential units 3A, 3B according to the first and second modification examples constitute a differential unit product line.

Each of the differential units 3A, 3B according to the first and second modification examples has a configuration similar to that of the differential unit 3 according to the above embodiment except for the axial position of the second partition wall 534 located below the pinion gear shaft 4. In the differential unit 3A according to the first modification example, the second partition wall 534 is located closer to the front of the vehicle than in the differential unit 3. In the differential unit 3B according to the second modification example, the second partition wall 534 is located closer to the rear of the vehicle than in the differential unit 3. Due to this difference in position of the second partition wall 534, the same amount of lubricating oil O as that for the differential unit 3 is injected into the differential units 3A, 3B according to the first and second modification examples.

Specifically, in the case where the differential unit 3A is tilted as shown in FIG. 5, the injection hole 50 is located at a relatively lower position in the vertical direction with respect to the rotation axis $O_1$. In this case, if the second partition wall 534 is located at the same position as in the differential unit 3, the amount of lubricating oil O that is injected is reduced. Accordingly, in the differential unit 3A, the second partition wall 534 is provided at a position closer to the front of the vehicle than in the differential unit 3 to increase the capacity of the first sections 53a. An appropriate amount of lubricating oil O is thus injected.

In the case where the differential unit 3B is tilted as shown in FIG. 6, the injection hole 50 is located at a relatively higher position in the vertical direction with respect to the rotation axis $O_1$. In this case, if the second partition wall 534 is located at the same position as in the differential unit 3, the amount of lubricating oil O that is injected is increased, which increases cost. Accordingly, in the differential unit 3B, the second partition wall 534 is provided at a position closer to the rear of the vehicle than in the differential unit 3 to reduce the capacity of the first sections 53a. A necessary and sufficient amount of lubricating oil O is thus injected.

As described above, in the differential units 3, 3A, and 3B, the amount of lubricating oil O to be injected is adjusted to the appropriate value by the position of the second partition wall 534. The differential units 3, 3A, and 3B have the same external shape and size. Accordingly, even when the differential units 3, 3A, and 3B are mounted in a tilted manner with respect to the horizontal direction due to the difference in height of the vehicle on which the differential units 3, 3A, and 3B are mounted, the differential units 3, 3A, and 3B can be mounted on the vehicle without changing the positions of structures around the differential units 3, 3A, and 3B in the vehicle such as piping. The position of the second partition wall 534 can be changed by changing the shape of molds used for casting.

Notes

The invention is described above based on the embodiment. However, the embodiment does not limit the invention according to the claims. It should also be noted that not all combinations of the features described in the embodiment are always essential to solve the problem of the invention.

The invention can be modified as appropriate without departing from the spirit and scope of the invention. For example, the above embodiment is described with respect to the case where the differential unit 3 according to the embodiment of the invention is mounted on the four-wheel drive vehicle 1 based on a front-wheel drive vehicle (FF vehicle). However, the invention is not limited to this. The differential unit 3 according to the embodiment of the invention may be mounted on a four-wheel drive vehicle based on a rear-wheel drive vehicle (FR vehicle). In this case, the first accommodating portion 51 of the differential carrier 5 is disposed at a position located closer to the front of the vehicle than the bearing support portion 53, and the second accommodating portion 52 of the differential carrier 5 is disposed at a position located closer to the rear of the vehicle than the bearing support portion 53.

The above embodiment is described with respect to the case where the pinion gear shaft 4 is coupled to the propeller shaft 13 via the driving force transmission device 7. However, the driving force transmission device 7 may be omitted. In this case, the pinion gear shaft 4 is directly coupled to the propeller shaft 13.

What is claimed is:

1. A differential unit comprising:
   a pinion gear shaft including a shaft portion and a gear portion;
   a ring gear meshing with the gear portion;
   a differential case that rotates with the ring gear;
   a differential gear mechanism accommodated in the differential case;
   a differential carrier having an accommodating space accommodating the differential case and the ring gear; and
   a pair of bearings supporting the pinion gear shaft such that the pinion gear shaft is rotatable with respect to the differential carrier, wherein the differential carrier has an inner cylindrical portion, an outer cylindrical portion, and a connecting portion that are provided as a single member, the inner cylindrical portion having a bearing fitting surface in an inner peripheral surface, the pair of bearings being fitted on the bearing fitting surface, the outer cylindrical portion being provided radially outward of the inner cylindrical portion, and the connecting portion connecting the inner cylindrical portion and the outer cylindrical portion.

2. The differential unit according to claim 1, wherein the connecting portion includes a plurality of first partition walls and at least one second partition wall, the plurality of first partition walls extending in an axial direction and partitioning a space between the inner cylindrical portion and the outer cylindrical portion into a plurality of sections located next to each other in a circumferential direction, and the at least one second partition wall further partitioning at least a part of the plurality of sections partitioned by the plurality of first partition walls into two sections located next to each other in the axial direction.

3. The differential unit according to claim 2, wherein the plurality of first partition walls are disposed in a radial pattern about a rotation axis of the pinion gear shaft.

4. The differential unit according to claim 2, wherein:
   one of the two sections partitioned by the second partition wall communicates with the accommodating space; and lubricating oil that causes the gear portion of the pinion gear shaft and the ring gear to smoothly mesh with each other is stored in the one of the two sections and the accommodating space.

5. The differential unit according to claim 4, wherein the second partition wall is provided at least in two or more sections located below the pinion gear shaft among the plurality of sections partitioned by the plurality of first partition walls.

6. A differential unit product line, comprising a plurality of differential units, wherein:
   the plurality of differential units have the configuration according to claim 4; and
   an axial position of the second partition wall with respect to the inner cylindrical portion and the outer cylindrical portion is different between or among the plurality of differential units.

* * * * *